(12) United States Patent
Krause

(10) Patent No.: US 6,398,115 B2
(45) Date of Patent: *Jun. 4, 2002

(54) SYSTEM FOR AUTHENTICATING USE OF TRANSACTION CARDS HAVING A MAGNETIC STRIPE

(76) Inventor: Arthur A. Krause, 20642 Skouras Dr., Canoga Park, CA (US) 91306

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/081,446

(22) Filed: May 19, 1998

Related U.S. Application Data

(63) Continuation of application No. 08/390,539, filed on Feb. 17, 1995, now Pat. No. 6,089,457.

(51) Int. Cl.$^7$ ............................................... G06K 19/06
(52) U.S. Cl. ........................................ 235/492; 235/380
(58) Field of Search ................................ 235/492, 486, 235/483, 380, 375, 487, 493; 360/2

(56) References Cited

U.S. PATENT DOCUMENTS

| | | | | |
|---|---|---|---|---|
| 3,655,946 A | * | 4/1972 | Morita et al. | 235/493 |
| 3,818,187 A | * | 6/1974 | Lovendusky et al. | 235/493 |
| 4,926,480 A | * | 5/1990 | Chaum | 380/23 |
| 5,397,881 A | * | 3/1995 | Mannik | 235/380 |
| 5,412,192 A | * | 5/1995 | Hoss | 235/380 |
| 5,585,787 A | * | 12/1996 | Wallerstein | 340/825.34 |
| 5,955,961 A | * | 9/1999 | Wallerstein | 340/825.33 |

FOREIGN PATENT DOCUMENTS

| | | | | |
|---|---|---|---|---|
| JP | 0041587 | * | 2/1991 | 235/492 |
| JP | 3-41587 | | 2/1991 | 235/493 |
| WO | 93/17498 | * | 1/1993 | 235/486 |

* cited by examiner

Primary Examiner—Thien M. Le
(74) Attorney, Agent, or Firm—Dennis H. Lambert

(57) ABSTRACT

Transaction cards operable as "smart cards"; credit cards; debit cards; access cards; et cetera, having an self-enabling and self-disabling feature provides for authentication and proper user verification. The card receives input from a user and determines if the input is valid. If the user input is valid, the card responds by enabling a magnetic stripe thereon. The magnetic stripe is enabled for a limited time after which it is then disabled. A disabled magnetic stripe is then inoperable for activating card readers. A card which is lost or stolen cannot be used by unauthorized users as it would have a magnetic stripe in a disabled state and only an authorized user would have the ability to enable it. The card possesses a high level of compatibility with known methodology in the art and does not require additional equipment and systems to attain its high security level.

18 Claims, 8 Drawing Sheets

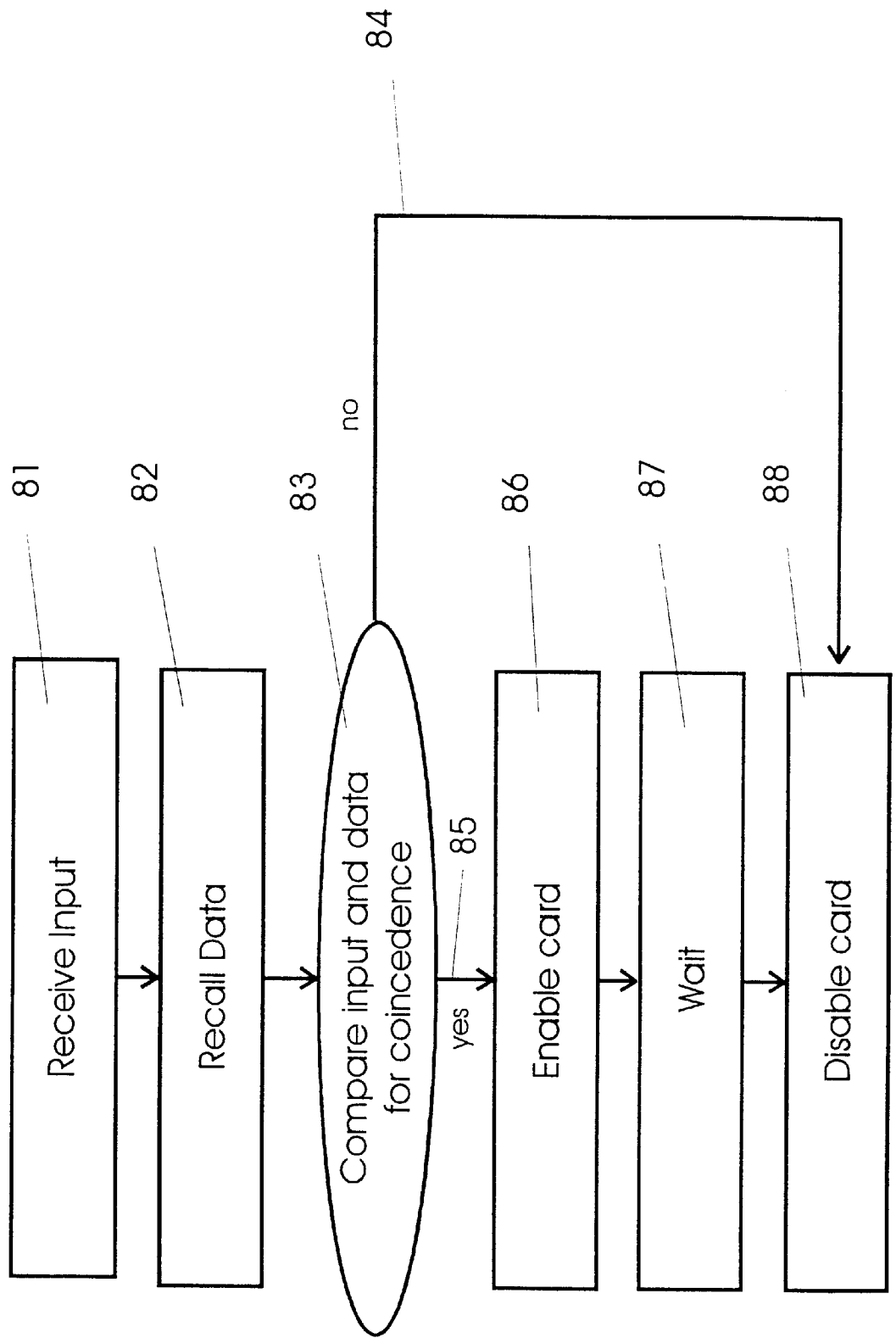

SYSTEM FOR AUTHENTICATING USE OF TRANSACTION CARDS HAVING A MAGNETIC STRIPE

This application is a Continued Prosecution Application of Ser. No. 09/081,446, filed May 19, 1998, which is, in turn, a continuation of application Ser. No. 08/390,539 filed on Feb. 17, 1995, now U.S. Pat. No. 6,089,457. The disclosure of that application is hereby incorporated by reference as if it were fully set forth here.

BACKGROUND OF THE INVENTION

This invention is generally concerned with authenticity verification systems for use with transaction cards and is specifically concerned with transaction cards which are operable for self-enabling and self-disabling in response to authenticity procedures and methods. Cards such as "smart" cards, credit cards, debit cards, access, et cetera, are common forms of a general group known as transaction cards.

Certain transaction between unfamiliar persons or transaction between person and machines sometimes require security measures which provide verification of the authority of the person making the transaction. Examples of such transactions may include but are not limited to: access to restricted locations, financial of "point-of-sale", simple personal identification, and document authentication.

Secured areas may have access restrictions which limit admission to certain persons having access authority. Sophisticated systems which interrogate biometric features such as cornea patterns or fingerprints have been used to identify authorized persons for access. Similarly, valuable documents sensitive to counterfeit may incorporate security measures which provide for authenticity. A drivers license has a photograph to associate the document with a particular person and to prevent use of the document by others. Passports may include photographs and further use of official seals or holograms to provide for authenticating documents. Each of the described situations have the requirement that an authorized person be properly identified. Whereas security for access to restricted locations typically require extremely sophisticated verification means, and whereas driver's license documents may be sufficiently authenticated by simple photographs, point-of-sale (POS) transactions have features associated therewith which are particularly suitable for certain other security and authentication systems.

Features of POS transactions systems include: the requirement that the system be quick and easy to use; does not require salespersons attention or time; supports a huge number of transactions; tamper resistant; and compatibility with common devices presently in place, for example credit cards, debit cards and others. Indeed, as is illustrated by recent activity in development of various systems, great attention has been directed to POS authentication devices and methods.

Cash has the inconvenience of being: usable if found by others (non-criminal use); improperly counted; mislaid; stolen (criminal use); or other misuse. It is therefore desirable to reduce exposure to loss resulting from the use of cash by employing another means of money transfer. Credit cards are commonly used, but fraudulent use of credit cards is an expensive problem. Debit cards which typically require low level identification such as entry of a personal identification number PIN in addition to presentation of a card with corresponding data reduces fraud but still suffers from compromise. By watching the legitimate user enter a PIN, a thief can acquire that code and other account information necessary to later steal from the account. Elaborate schemes involving fake ATM machines have also been used to obtain account information and PIN codes. As all of these unauthorized uses are very expensive to card issuers and ultimately to consumers, it is desirable to increase the security of the systems. To that end several attempts have been made to introduce new systems to POS transactions which reduce the fraudulent use of transaction cards.

In U.S. Pat. No. 5,180,901 inventor Hiramatsu teaches of a pressure sensor for inputting finger characteristic data. An authorized user having particular finger characteristics could activate the card but others could not. Inventors Butterworth teach of a keypad which receives a code and responds with a light signal to indicate authenticity in U.S. Pat. No. 4,879,455. An elaborate scheme worked out by Muehlberger in U.S. Pat. No. 5,285,382 yields a method for processing credit and debit cards for valid use. There is no shortage of good inventions in the field and the demand for security is very high.

Notwithstanding, new techniques have now been discovered which provide very novel uses of transaction cards, particularly with respect to point-of-sale type transactions. In contrast to the good and useful inventions mentioned, each having certain useful features, the instant invention is concerned with the enablement and disablement of a transaction card via writing and erasing data to a magnetic stripe on the card in response to a user input.

Systems of the invention are distinguished from those of the prior art in that they provide a very high level of compatibility with present standard systems in use yet provide a higher level of security than is attainable by devices and methods of the art. In particular, the invention provides a card which is operable for receiving a user input, validating that input and responding to valid input by enabling a standard format magnetic stripe, and further operable for disabling same magnetic stripe after use thereby preventing further use by unauthorized persons.

SUMMARY OF THE INVENTION

The invention provides for a transaction card having a magnetic stripe which can be enabled and disabled via a transducer incorporated into the card where the transducer is driven by a microprocessor in response to a user input. The user input, generally a code, serves to associate the card with its authorized user.

Although "transaction card" generally refers to a credit or debit type card, a transaction card of the invention can be any document or object which benefits from a security system which prevents unauthorized use thereof. The "magnetic stripe" is meant to be a magnetic medium which is operable for maintaining recorded data where the data can be written to and erased from the medium. The "transducer" is a device which is driven by electrical signals and provides a magnetic field or fields effective for writing data to and erasing data from the magnetic stripe. use of the terms "enabled" and "disabled" refer to the condition of the data on the magnetic stripe. An "enabled" magnetic stripe has data recorded thereon which can be read by a magnetic media scanner. A "disabled" magnetic stripe is one having data scrambled or erased such that a scanner cannot properly read information from the stripe. It is important to note that "disabled" essentially refers to the data on the stripe and not to recording mechanisms of the stripe. "User input" refers to a code, or sequence, or personal identification number PIN entered by way of a keypad or other user input means.

"Driven" refers to activation of the transducer to operate on the magnetic stripe. "Response" means that the system acts in accordance with the particular user input.

Since it is highly desirable to create a system which has minimal or no compatibility problems with existing systems and equipment, but one which increases the security possible therein, the invention has been developed without the requirement of new complicated equipment. Standard card readers presently installed in many thousands of retail locations require data in a certain format or formats. These formats are set forth in ISO standards and are useful for some preferred embodiments. Some cards of the invention are arranged to work with the presently installed card readers. It is also desirable to provide a system without complicated steps or steps which involve input from retailers. Methods of the invention therefore are directed to simple operations which quickly authenticate the card.

A transaction card user enters via a keypad integrated therein, a code which is compared by a microprocessor to a previously stored reference for coincidence. Detection of coincidence results in enablement of the data on the magnetic stripe, and lack of coincidence results in disablement of the data on the magnetic stripe.

While the invention provides particular benefits to transactions such as point-of-sale type financial transactions, it may also be useful for other transactions requiring verification of use of an object or document by authorized persons.

A primary object of the present invention to provide a system of security for objects and documents. It is a further object of the invention to provide security for transaction card devices. It is further an object of the invention to provide a transaction card security system having a high degree of compatibility with respect to equipment, methodology, habits and standards of existing arts. It is still further an object of the invention to provide a card which is inexpensive to produce.

A better understanding can be had with reference to the detailed description of preferred embodiments and with reference to the appended drawings. These embodiments represent particular ways to realize the invention and are not inclusive of all ways possible to benefit from the invention. Therefore, there may exist embodiments that do not deviate from the true scope of the invention as set forth by the claims, but do not appear here as specific examples.

BRIEF DESCRIPTION OF THE INVENTION

These and other features, aspects, and advantages of the present invention will become better understood with regard to the following description, appended claims and drawings where:

FIG. 8 is a flow diagram for a version of a method of the invention.

PREFERRED EMBODIMENTS OF THE INVENTION

Transaction cards of the invention may be embodied in many forms. In some preferred embodiments, the card may have the identical appearance of a simple credit card except for a keypad. Since it is an object of the invention to provide cards compatible with presently known systems, a preferred version of the invention, the best mode known to the inventor, is presented here as an example.

Figure 1:
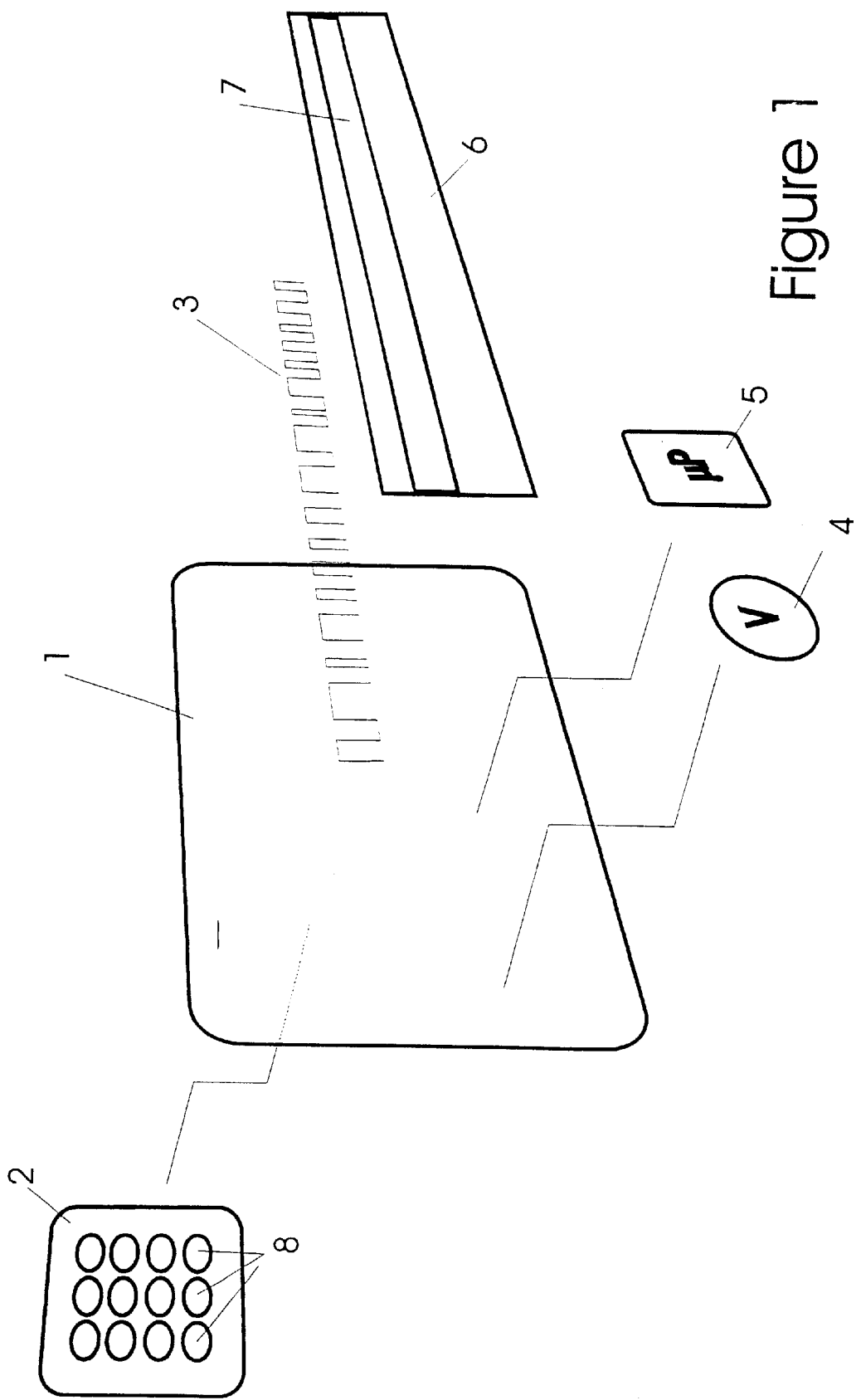
FIG. 1 is an exploded perspective view of some of the components of a transaction card of the invention.

Accordingly, and with reference to the appended drawing FIG. 1, transaction cards of certain preferred versions of the invention have the following major components: a card 1, a magnetic medium 6, a data track or data tracks 7, a keypad 2, a microprocessor 5, an energy source 4, and a transducer 3. When assembled together, these elements occupy the space between the two planar surfaces of the card, the card being of a standard size as set forth in ISO standards 7811/1–5, and others. The card 1 can be made of inexpensive plastics or other materials compatible with microelectronic manufacture techniques. The energy source 4 can be a simple battery sufficient for providing energy to a microprocessor and to a transducer 3. A microcontroller or microprocessor 5 is a micro-integrated circuit device operable for performing logic operations, retaining microcode type information, executing that microcode, storing data, recalling data, comparing data, receiving inputs from sources outside the processor, transmitting output signals to output devices, and other functions common to such devices. A keypad 2 is operable for transducing user tactile input into electrical signals compatible with processing routines of the microprocessor and is in electrical communication therewith. Data tracks 7 are areas on the magnetic medium which contain data in the form of spatially modulated magnetized regions. The data tracks can be arranged in many ways, but very detailed specifications set forth in the ISO standards suggest a format which is desirable in best embodiments of the invention. Although only one track is shown in the FIG. 1, cards generally have two or three data tracks. Extension to multiple tracks is clearly anticipated. The elements mentioned so far are known to have been used with other transaction card type devices. The transducer 3 and special magnetic medium 6, sometimes herein called a magnetic stripe, are elements unique to this invention and a detailed explanation of each follows.

The magnetic medium 6 is similar to other known magnetic media, except that it has sensitivity properties which may be different. In general, magnetic media of the invention has a lower coercivity, i.e. is more responsive than comparable, frequently used media. In a data "writing" process, normal credit cards having a magnetic stripe are generally exposed to very strong magnetic fields which "permanently" record data thereon. The sensitivity or coercivity of that media is about 300 Orstead. By "permanently" it is meant that the data is intended to be long-lived and is not changeable from day to day by the user. Of course, the cards can be erased and re-written but this is not a normal procedure and an issuing institution is likely to do this operation. It is not considered a user function or a function executed as a result of a user action. The cards of the invention by comparison have a "dynamic" magnetic stripe. This medium is compatible with frequent changes in the state of the data it contains. In addition, it is desirable to make changes to the data with small amounts of energy to increase the life of the energy source 4. For these reasons, a magnetic medium which has a coercivity between 3 and 200 Orstead may be used in some preferred embodiments. Coercivities less than 3 may not be useful for maintaining data as even the Earth's magnetic fields, fields which normal use of the cards may result in adverse exposure thereto, and may affect the data thereon. In addition, electrical devices used in conjunction with cards such as card readers, scanners, electronic cash registers, et cetera, may also expose cards to magnetic fields having a magnitude strong enough to affect such sensitive materials. A magnetic material having a sensitivity of 130 Orstead may be ideal as data could easily be written with small amounts of energy and that data may be stable in fields to which the card would normally be exposed. Other properties and sizes of magnetic media useful in various versions of the invention may be exactly the same as commonly used materials. However use of the word dynamic in this disclosure means that the magnetic stripe is writable and erasable from time-to-time during normal use of the card. Normally, after a card becomes within the possession of the user and the signal on the magnetic stripe somehow changes, the card is "damaged" and becomes inoperable.

Figure 2:
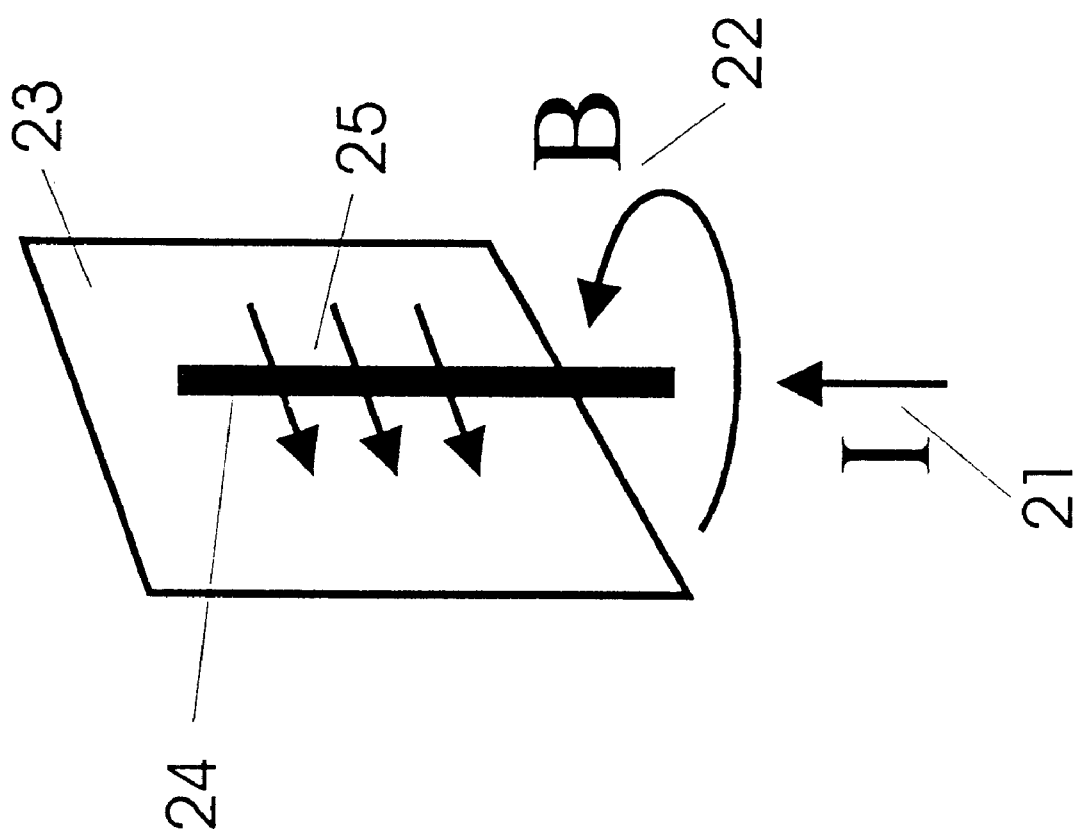
FIG. 2 is a diagram illustrating the interaction of electric current with magnetic media.
Figure 3:
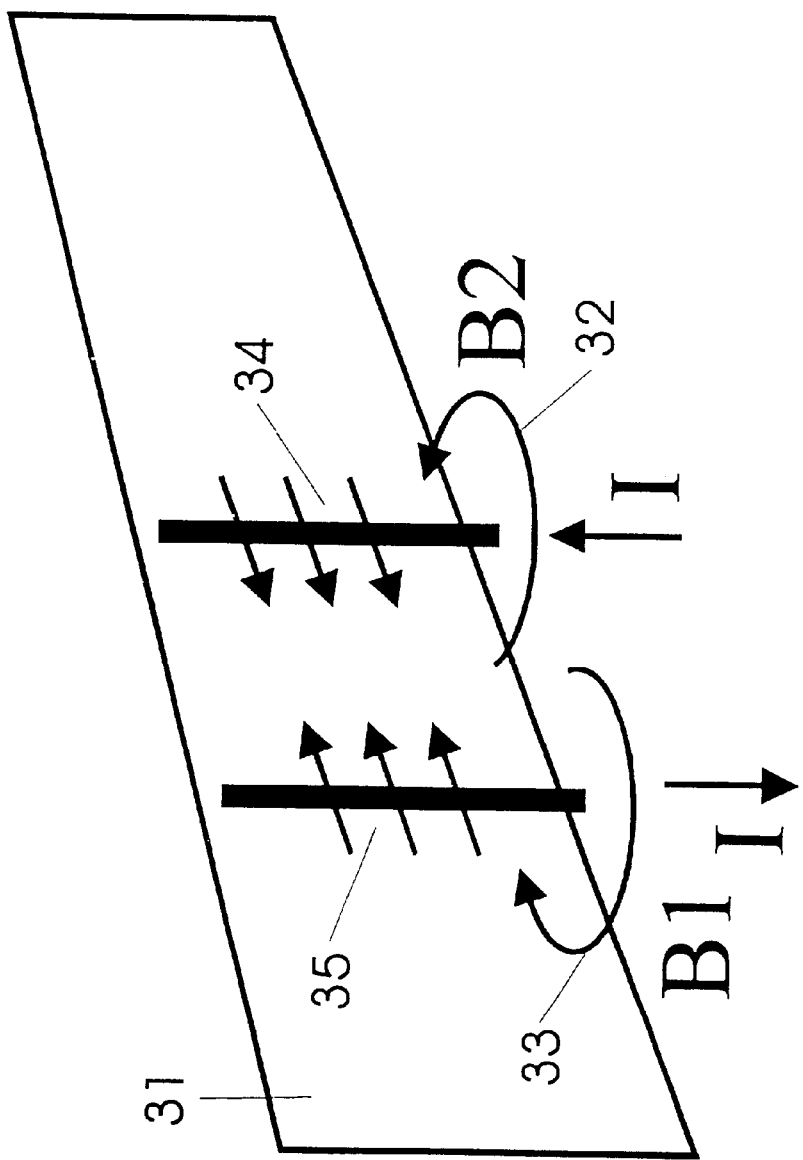
FIG. 3 is similar diagram where the magnetic media is a stripe.
Figure 4:
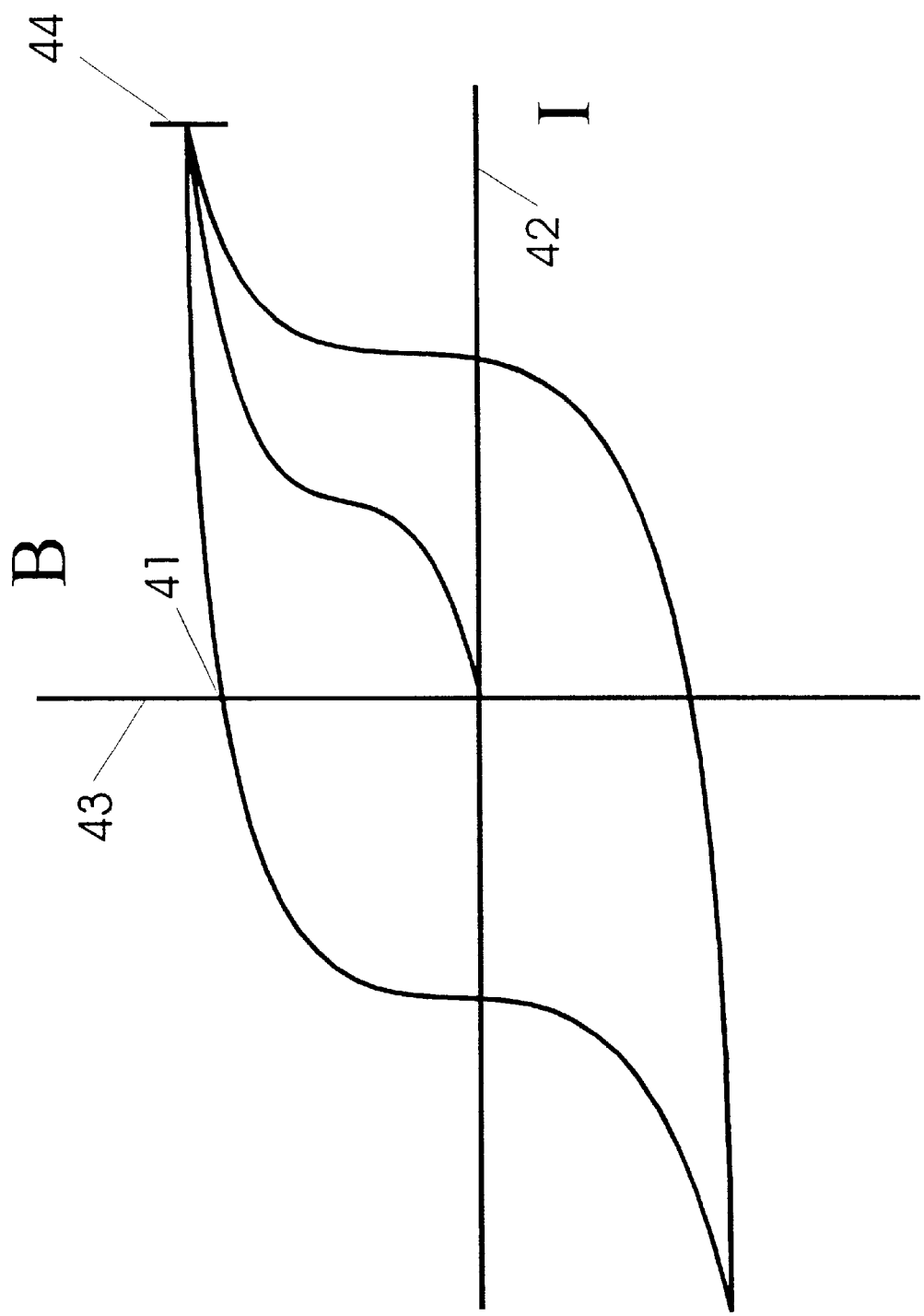
FIG. 4 is a plot of applied current verses magnetic response of a magnetic medium.

The transducer 3 is a new device with respect to transaction cards. Although it can be a simple electrical conductor, a wire for example, a spatial arrangement of the conductor contains important information. The transducer is operable for converting electrical energy supplied by the energy source 4 into magnetic energy which can write data to the magnetic stripe in a predetermined format. In the simplest case, as is illustrated in FIG. 2, one can imagine a single wire 24 in close proximity to a planar sheet 23 of magnetic material. A current 21 passing through the wire 24 will cause a magnetic field 22 around the wire in accordance with Maxwell's equations. The direction of the magnetic field in the plane of the magnetic material 23 is illustrated by the arrows 25. That is also the direction of magnetization which will remain on the material after the current ceases. The example in FIG. 2 is then expanded to a more complicated illustration in FIG. 3. A second wire is introduced to the scheme and the magnetic material is extended into a long rectangular format or a stripe 31. By clever arrangement, the second wire can have a current passing therethrough in the opposite direction compared to the first wire, thus causing a magnetic field 33 in the opposite direction. Accordingly, the "recorded" field 35 is opposite in direction to the "recorded" field 34. These fields may remain on the stripe even after the currents are removed. This can be further understood from the well known plot of current 42 verses magnetic field 43 for magnetic type materials illustrated in FIG. 4. If an applied current causes a magnetic field strong enough to reach the saturation point 44 of the material, and then the current is removed, the magnitude of the resultant magnetic field remaining on the material will be indicated by the vector 41.

Figure 5:
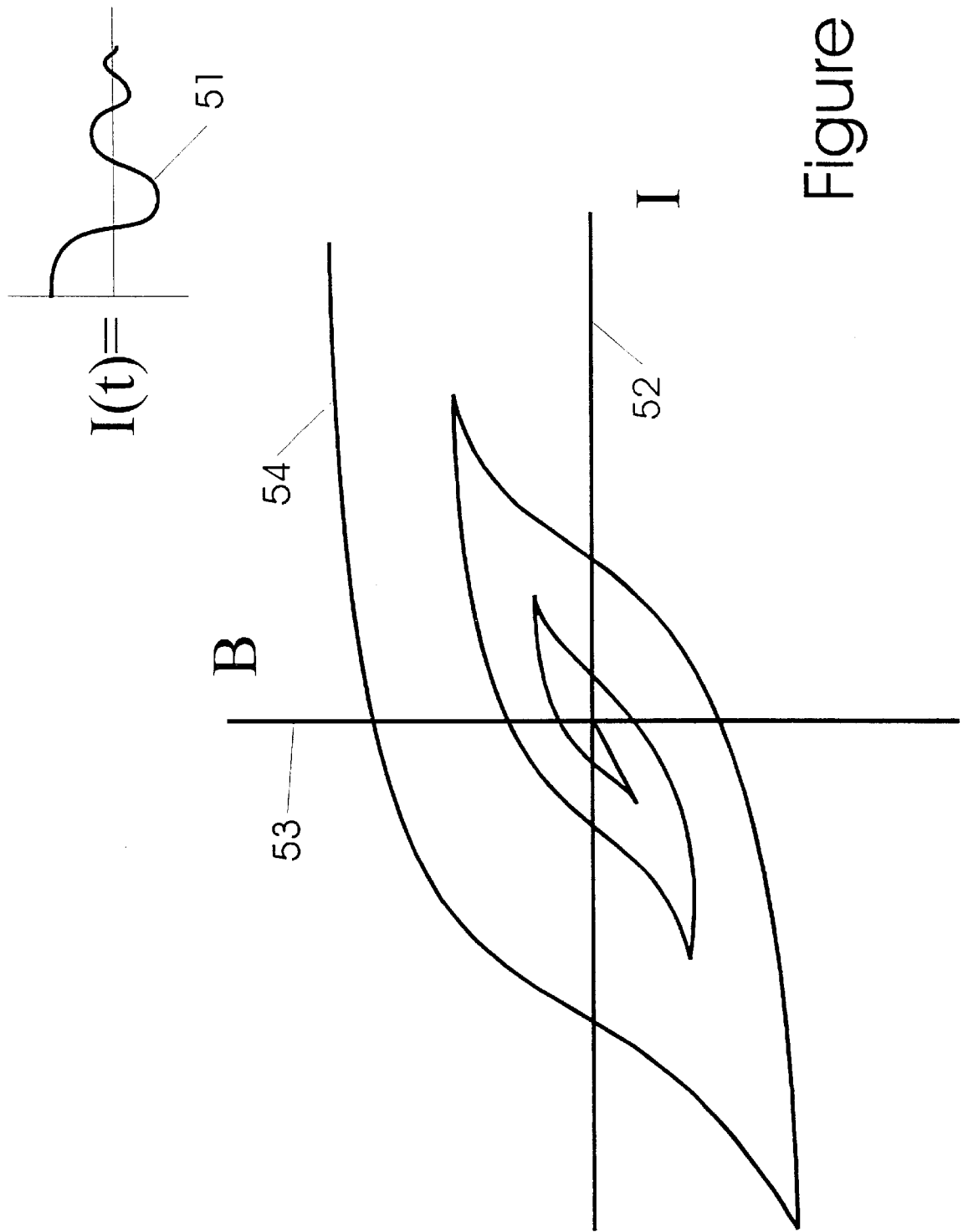
FIG. 5 is a similar plot showing the response to a special signal having a particular time dependence.

The removal of a magnetic field from a magnetic material is also of great interest to the present invention. FIG. 5 shows a current pulse 51 as a function of time that is sinusoidal and continuously decreasing in amplitude. The same plot of applied current 52 versus resultant magnetic field 53 yields a curve as shown at 54. After such signal is applied to either wire, the field remaining on the magnetic material is negligible. Application of a pulse as described is sometimes herein referred to as "erasing" or "disabling" the data on the medium. One could easily appreciate that by connecting the two wires of FIG. 3 at the tops thereof, an applied current will pass through one wire first and the other wire second in directions appropriate to cause the fields shown. This can be repeated many times along the stripe to create a circuit of wire having a single current which produces fields on the stripe in various locations.

Figure 6:
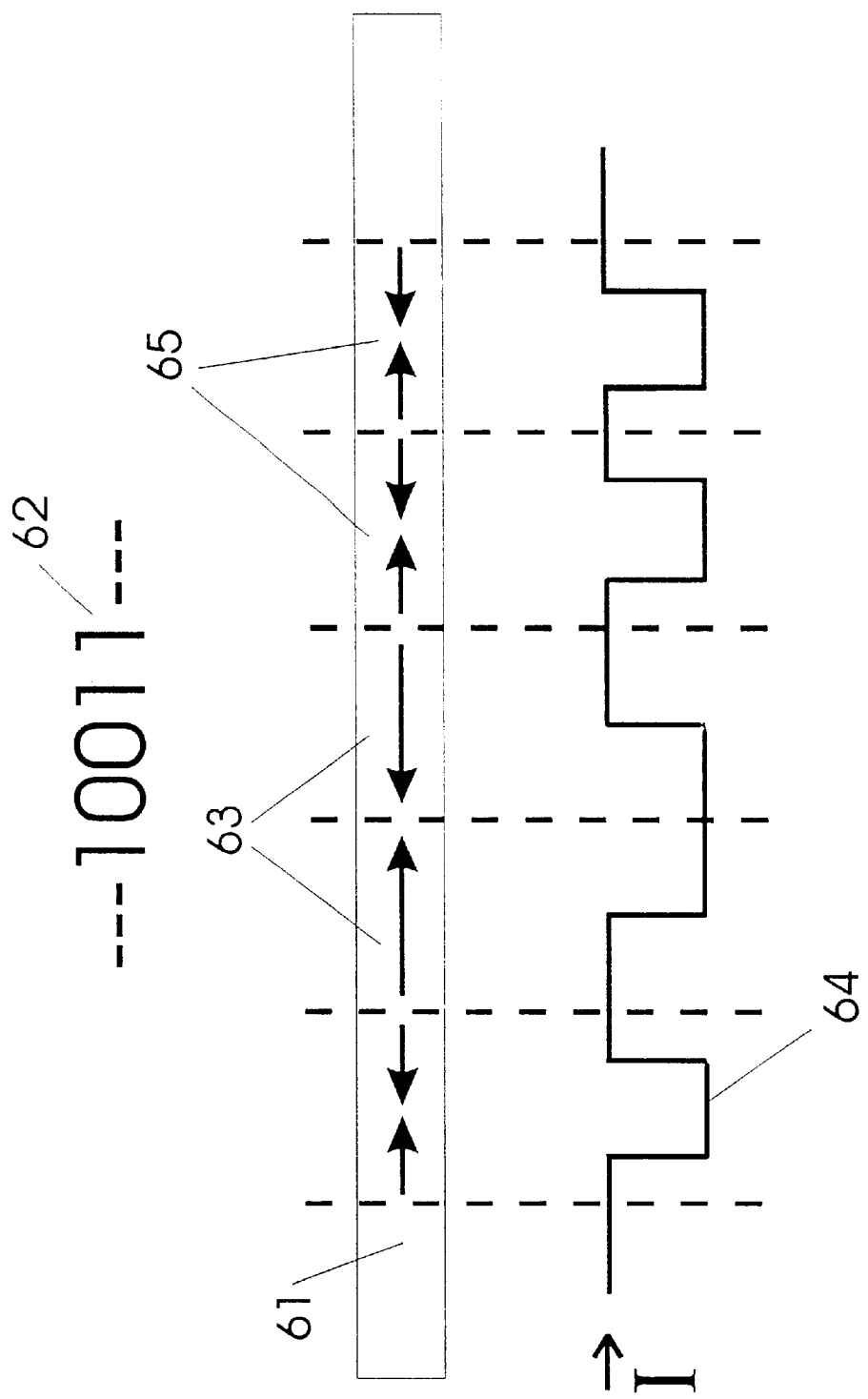
FIG. 6 is an illustration of one version of a data format.

The exact locations of the wires can be manipulated to form some desired spatial pattern. Indeed, the spatial pattern on magnetic stripes is well known to be useful for encoding said stripes with digital information relating to the function of the cards containing such stripes. The ISO standards for transaction cards call for a character of five bits, four data bits and a parity bit. To provide for a transducer which is capable of recording or "writing" to a magnetic stripe such five bit characters, a circuit can be arranged as in FIG. 6. A single wire 64 is formed into a pattern of right angles forming a particular spatial pattern. Although the wire 64 is drawn away from the stripe of magnetic material 61 for clarity in the figure, the dotted lines indicate that when in close proximity the wire and magnetic material have corresponding areas. The arrows indicate the direction of magnetization if the wire is laid on top of the stripe as drawn with current from the left. The dotted lines separate the stripe into "bit bins" where each bin contains one bit of data. There are five bit bins shown in the figure. A data bit corresponding to a "1" is recorded by having a change in the direction of magnetization within the bit bin. The direction of magnetization always changes between bit bins. This convention is well known in the art but is restated here to reinforce the relationship between the pattern and the transducer 3 (64 in this example) which is new. The bit bins indicated by 63 contain therefore data "0"'s and the bit bins indicated by 65 contain data "1"'s. The spatial pattern of the wire in FIG. 6 is effective for writing a character "1001" having a parity bit of "1" to a magnetic stripe. Of course, magnetic stripes on transaction cards may contain many characters and the structure illustrated is extendible to a plurality of characters as appropriate for the occasion of interest.

For illustrations of the best contemplated transducer, a simple single strand wire was shown. The reader will appreciate that other forms of transducers may be useful for providing a spatially varying magnetic fields and thereby serve to "write" data to a magnetic stripe. Coils of wires, multiple current carrying conductors together, printed circuits, et cetera all may serve the task without deviating from the objective which is to convert electrical energy into magnetic energy in a spatially distributed manner. Since the ISO standards for transaction cards can require a bit density of up to 210 bits per inch, the conductors which produce useful magnetic patterns are necessarily small. Their size is compatible with printed circuit technologies. Thus to form appropriate transducers, methods of printed circuits and other lithographic techniques are completely anticipated.

Figure 7:
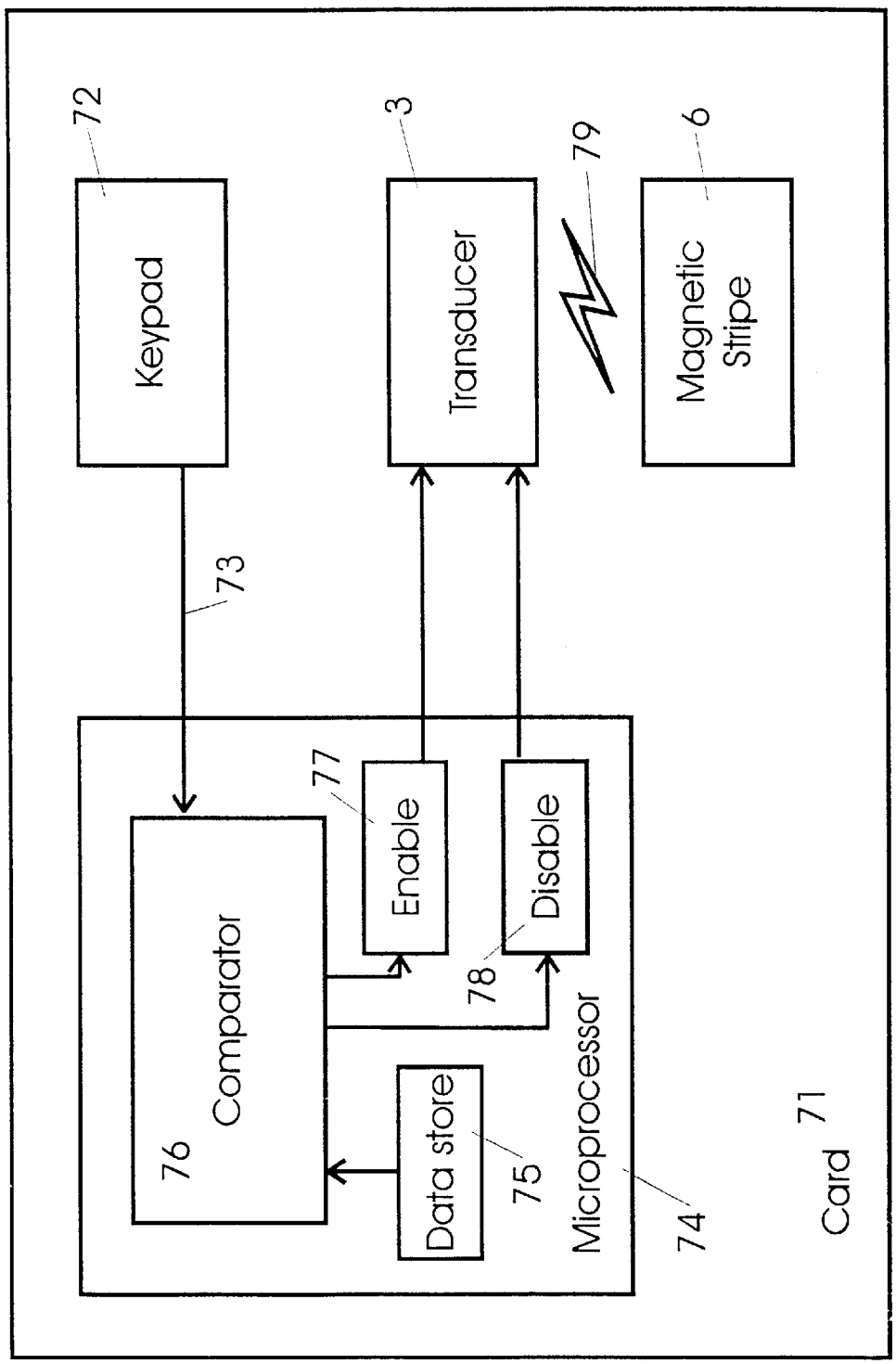
FIG. 7 is a block diagram of major components of some devices of the invention.

In addition to the primary elements mentioned above, secondary elements include: a data store 75, comparator 76, enable pulse generator 77, and disable pulse generator 78. These elements are usually just additional functions of the microprocessor and the general case above having a "microprocessor" is considered to include these secondary elements. FIG. 7 shows a block diagram of a transaction card 71 having all of the elements within the card as it is with the actual mechanical device. A keypad 72 is available for user inputs and is in communication 73 electronically with the microprocessor 74. Tactile input from a user is converted to an electronic pulse or pulses and transmitted to the microprocessor. A data store 75 within the microprocessor has a predetermined code stored therein. The data store is connected to the comparator such that the code can be recalled and transmitted thereto. This code has similar function to the PIN used for ATM cards. The code is compared to the user input to detect coincidence between them in a comparator 76. If the comparator detects that the user input code has been properly entered, then it activates an enable pulse generator 77. Alternatively, if the code is not correctly entered the comparator responds by activating the disable pulse generator 78. The pulse generators are operable for taking an activate signal from the comparator and generating an electrical pulse compatible with the function, enable or disable, at hand. In the case of enablement, the pulse is usually a square wave pulse of a magnitude large enough to magnetize the magnetic stripe and is of a duration compatible with the clock cycle of the microprocessor and circuit constraints like resistance, capacitance and inductance of the device. In the case of disablement, the pulse is a sinusoid having a decreasing magnitude. Both of the pulse generators are connected electrically to the transducer 3. The transducer is in close proximity to the magnetic stripe 7 and therefore is in magnetic communication 79 therewith.

With the above mentioned hardware in place, the card is operable for executing the following method. The system performs the following steps: receives input; recalls data; compares input and data; generates either an enabling pulse and enters a wait state, or a disable pulse; then disables the data on the stripe and returns to the receive input step.

The card is generally in a disabled state. By "disabled" it is meant that any data on the magnetic stripe has been erased rendering the card temporarily useless. A disabled card cannot be read by card readers. The card remains in this state but awaits a user input. A user input at a keypad is then converted into an electric signal and transmitted to the microprocessor. Upon receipt of user input the microprocessor recalls from a data store a previously recorded code. A comparator receives both the user input and the recalled code and attempts to detect a coincidence. If a coincidence is detected, then the comparator activates an enable pulse generator. If a coincidence is not detected, then the computer either activates a disable pulse or allows the card to remain disabled and returns to the first step. If the enable pulse is activated, then a square wave electrical pulse is generated and transmitted to the transducer. The current passing through the transducer causes magnetic fields in a predetermined spatial distribution to magnetize the magnetic stripe. The magnetic stripe then is operable for stimulating a card reader in the known manner. After a period of time sufficient for swiping the card through a card reader, between about 30 seconds and 5 minutes, the stripe is disabled again by activation of the disable pulse generator. The disable pulse generator produces a sinusoidal signal of decreasing amplitude. This pulse can be transmitted to the transducer thereby de-magnetizing or erasing the data on the stripe. The card is reset into a disabled state and again awaits user input.

In addition, methods of the invention are supported by the following secondary steps where an issuing institution: prepares a card with an appropriate transducer, writes data to a data store, issues card to a user. Preparation of an appropriate transducer includes arranging the pattern of the transducer to represent a desired data stream having characters specific to an account or other identifying object. A card is also provided with a data store which can be programmed. A reference code or number is recorded into the data store by an issuing institution. This is the number that is recalled in the steps described above. The card having been prepared in this way can be issued to a user. Security is realized because the code is stored in a highly tamper resistant way. A user receives the card and instructions regarding the stored code (is told the code). Cards found or stolen by unauthorized users would not be able to be activated without knowledge of the code.

In accordance with each of the preferred embodiments of the invention, there is provided an apparatus for and method of providing a transaction card having a means of authentication. It will be appreciated that each of the embodiments described include both an apparatus and method and that the apparatus and method of one preferred embodiment may be different than the apparatus and method of another embodiment.

Although the present invention has been described in considerable detail with reference to certain preferred versions thereof, other versions are possible. Therefore, the spirit and scope of the appended claims should not be limited to the description of the preferred versions contained herein.

I claim:

1. A machine-readable transaction card which is enabled for authenticating a transaction upon input directly to the card of appropriate data by a user via use of a keypad integral with the card, and is disabled upon input directly to the card of incorrect data by the user via use of the keypad, said card including a machine readable magnetic stripe for recording and storing said data, and a transducer for altering the data recorded on the stripe in response to user input to the keypad.

2. A transaction card as claimed in claim 1, wherein:
the card automatically becomes disabled upon the elapse of a predetermined time interval after it has been enabled by user input.

3. A transaction card as claimed in claim 1, wherein:
the magnetic stripe is responsive to user input and comprises a magnetic media operable for maintaining magnetic fields and having the ability to have its magnetic state changed in response to correct entry by the user of a predetermined code.

4. A transaction card as claimed in claim 3, wherein:
the magnetic stripe is enabled or disabled, as appropriate, in response to tactile entry of a code or identification directly to the card via the keypad by the user.

5. A transaction card as claimed in claim 1, wherein:
the card further includes an energy source, and a logic processor, each incorporated into the card.

6. A transaction card as claimed in claim 5, wherein:
said energy source is a battery in electrical connection with the logic processor;
said transducer is in communication with the logic processor and is an electrical conductor operable for converting electrical energy to magnetic energy in a spatial pattern;
said keypad is a plurality of switches operable for converting tactile user input into an electrical signal processable by the logic processor, said processor being a microcircuit operable for receiving the electrical signal, comparing it to a stored code, and energizing said transducer in accordance with that comparison; and
said magnetic stripe is in proximity to said transducer and is operable in response thereto for maintaining a magnetic field thereon.

7. A transaction card as claimed in claim 6, wherein:
said battery is a thin, flat energy cell having a thickness less than about 3 mm and greater than about 0.2 mm, whereby the cell can be incorporated in the thickness of a standard transaction card;
the keypad is a thin, flat element containing said plurality of switches, each switch being operable for providing a unique signal to the logic processor; and
the logic processor microcircuit has:
 (a) a first portion operable for receiving user inputs;
 (b) a second portion for storing and recalling a reference code;

(c) a third portion in communication with the first and second portions operable for executing a logic program including comparing user inputs to reference codes;

(d) a fourth portion for generating an enable signal in accordance with the comparison; and (e) a fifth portion in communication with the transducer and operable for delivering the enable signal thereto.

8. A transaction card as claimed in claim 1, wherein:

the card further includes an energy receiving means connected between the keypad and a logic processor, said transducer being responsive to a signal from the processor to alter the data on said magnetic stripe.

9. A transaction card as claimed in claim 8, wherein:

said energy receiving means is an electrical conductor in communication with the logic processor and having contacts which are accessible to the exterior of the card.

10. A method of authenticating and enabling a normally disabled transaction card having a magnetic stripe responsive to user input to the card, comprising the steps of:

receiving user input data directly to the card via a keypad integrated into the card;

comparing the user input data to a stored reference signal; and altering data recorded on said stripe in accordance with said comparison with prescribed data to enable said stripe and authenticate said card if coincidence is detected between the user input data and the stored reference signal.

11. A method as claimed in claim 10, wherein:

said step of receiving user input data comprises receiving an electrical signal representing a user input at a logic processor;

said step of comparing the user input to a stored reference signal comprises determining if a coincidence exists between the user input and the stored reference signal; and said step of enabling the magnetic stripe with prescribed data comprises writing a magnetic signal to the magnetic stripe in accordance with the determination of coincidence, such that if coincidence is detected the magnetic stripe is enabled with prescribed data, and if coincidence is not detected the magnetic stripe is not enabled.

12. A method as claimed in claim 10, comprising the further steps of:

storing a reference signal in a logic processor memory;

disabling the magnetic stripe in response to input of incorrect data; and disabling the magnetic stripe in response to elapse of a predetermined time interval.

13. A method as claimed in claim 12, wherein:

the step of storing a reference signal in a memory comprises providing to a storage means, and storing therein, a predetermined reference signal, whereby authorized persons could have knowledge of the predetermined reference signal;

the steps of disabling the magnetic stripe in response to input of incorrect data or in response to elapse of a predetermined time interval comprise applying a decreasing amplitude sinusoidal electronic signal to a microcircuit arranged to create a spatial distribution of magnetic fields, whereby a signal on the magnetic stripe is erased and the magnetic stripe is disabled;

the step of receiving user input comprises converting a physical tactile user input to the keypad to an electronic signal processable by a logic processor;

the step of comparing the user input to a stored reference signal comprises comparing the electronic signal representing the user input to the predetermined reference signal to detect a coincidence between those signals;

the step of enabling the magnetic stripe with prescribed data comprises, if a coincidence is detected, enabling the magnetic stripe by writing a spatially modulated magnetic signal to the magnetic stripe by applying an energetic electrical pulse to a spatially distributed microcircuit, and if a coincidence is not detected, allowing the magnetic stripe to remain disabled; and the step of disabling the magnetic stripe in response to the elapse of a predetermined time interval comprises allowing a period of time, e.g., thirty seconds to five minutes, to pass following enablement of the stripe, sufficient for a user to use the transaction card in a manner consistent with use of magnetic stripes.

14. A normally disabled transaction card having a machine readable magnetic stripe on which data is recorded as a result of data input directly to the card by a user via a keypad integrated into the card, said card being enabled by recording on said stripe appropriate data input to the card via the keypad, is disabled by input to the card of inappropriate data, and following enablement is disabled upon the elapse of a predetermined time interval.

15. A transaction card as claimed in claim 14, wherein:

said magnetic stripe is devoid of authenticating data until a user inputs appropriate information to record authenticating data on the stripe.

16. A transaction card as claimed in claim 15, wherein:

the card includes a microprocessor which stores a predetermined code and compares it with data input by the user to determine if the user has input correct data; and means responsive to a signal from the microprocessor to record data on the stripe to enable the card to authenticate a transaction when the user has input correct data, and to alter any data on the stripe to disable the card from authenticating a transaction when the user has input incorrect data.

17. A transaction card having an area for containing data that may be discerned for authenticating a transaction, comprising:

means on said card responsive to tactile input directly to the card of appropriate information by a user to input data to said area to enable said data to be discerned to authenticate a transaction; and means responsive to input of incorrect information by a user to alter any data in said area to render said card incapable of authenticating a transaction.

18. A transaction card as claimed in claim 17, wherein:

said area comprises a magnetic stripe on which data is recorded and erased during normal use of the card to authenticate transactions.

* * * * *